Dec. 3, 1957 J. G. HINSDALE 2,815,455

QUADRATURE STRIPPING NETWORK

Filed Nov. 21, 1956 2 Sheets-Sheet 1

INVENTOR
JAMES G. HINSDALE,
BY
Perry E. Turner
AGENT.

Dec. 3, 1957 J. G. HINSDALE 2,815,455

QUADRATURE STRIPPING NETWORK

Filed Nov. 21, 1956 2 Sheets-Sheet 2

INVENTOR.
JAMES G. HINSDALE,
BY Perry E. Turner
AGENT.

United States Patent Office 2,815,455

Patented Dec. 3, 1957

2,815,455

QUADRATURE STRIPPING NETWORK

James G. Hinsdale, Scottsdale, Ariz., assignor to Lear, Incorporated, Santa Monica, Calif.

Application November 21, 1956, Serial No. 623,686

12 Claims. (Cl. 307—106)

Figure 1:
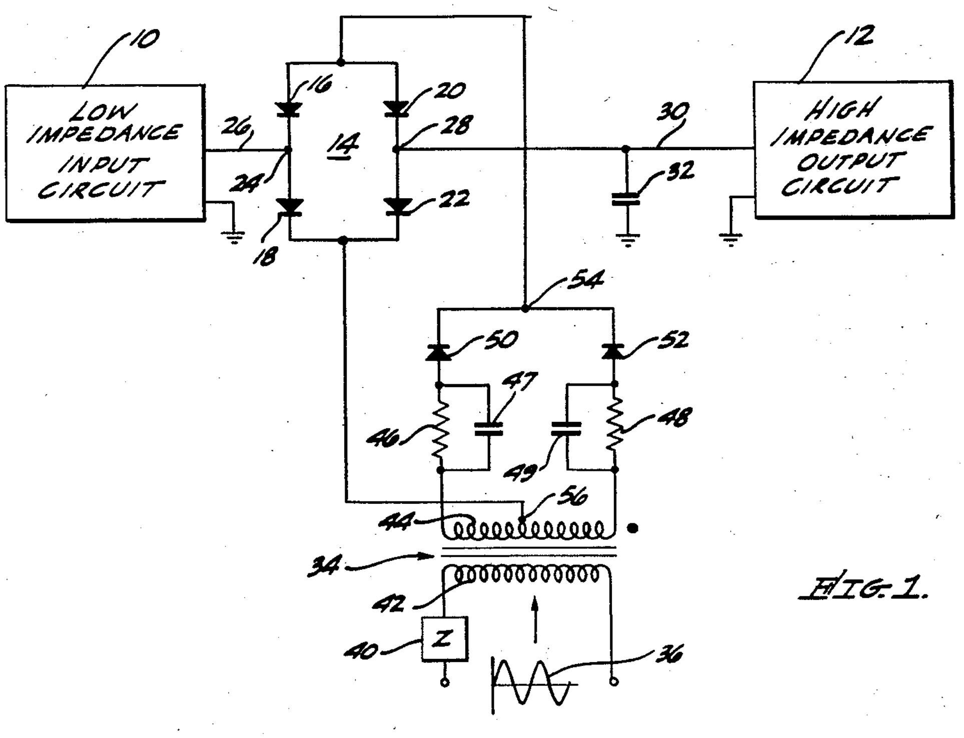

This invention relates to servo amplifiers operable in response to two or more input signals, and more particularly to means for developing a substantially rectangular wave voltage proportionate to a component of cyclical input signals which is in phase with a reference voltage, and which is insensitive to the effect of quadrature components.

In many servo amplifier applications, a command signal comprising a modulated carrier wave is applied to the amplifier to develop an output signal for use in moving a device to a desired position. Follow-up signals representing the position of the device are applied to the amplifier to oppose the command signal. When the device is in the desired position, the command signal and follow-up signal should be equal in magnitude and opposite in phase. However, as is well known, it is rare that the two signals are truly opposite in phase under such conditions, and a quadrature component exists which, if left uncorrected, would result in saturation of the amplifier. In addition, differences in the wave forms of the signals also tend to cause saturation of the amplifier. Attempts have been made to counteract or minimize the effects of quadrature and waveform variations, and have resulted in the use of additional equipment, often of elaborate design, which unduly tax space and weight limitations in aircraft. Further, where such apparatus employs networks including discriminator and filter circuits, an undesirable delay in the response of the amplifier exists. Also, such equipment contributes additional points of circuit failure, and hence increased maintenance problems.

It is a first object of this invention to provide an improved quadrature stripping network in which a substantially rectangular or square wave output voltage corresponding to input signals is developed with minimum delay.

It is another object of this invention to provide a quadrature stripping network for producing a cyclical output voltage, wherein quadrature effects in input signals produce no error in the shape of the output voltage, and which is characterized by minimum delay in developing such output voltage.

It is a further object of this invention to provide circuit means to produce a cyclical output voltage approximating a square wave form, which is insensitive to quadrature effects of input signals, in contrast to prior art arrangements for counteracting or minimizing such effects.

The above and other objects and advantages of this invention will be apparent from the following description, taken in conjunction with the accompanying drawings, in which a preferred embodiment of the invention is illustrated by way of example. The scope of the invention is pointed out in the appended claims.

Figure 3:
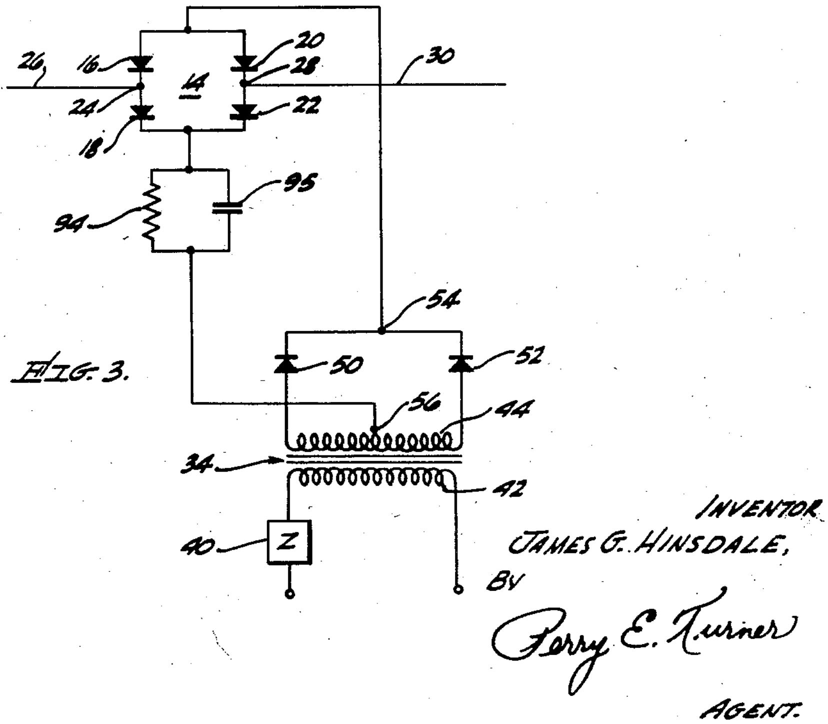
Figures 2A, 2B:
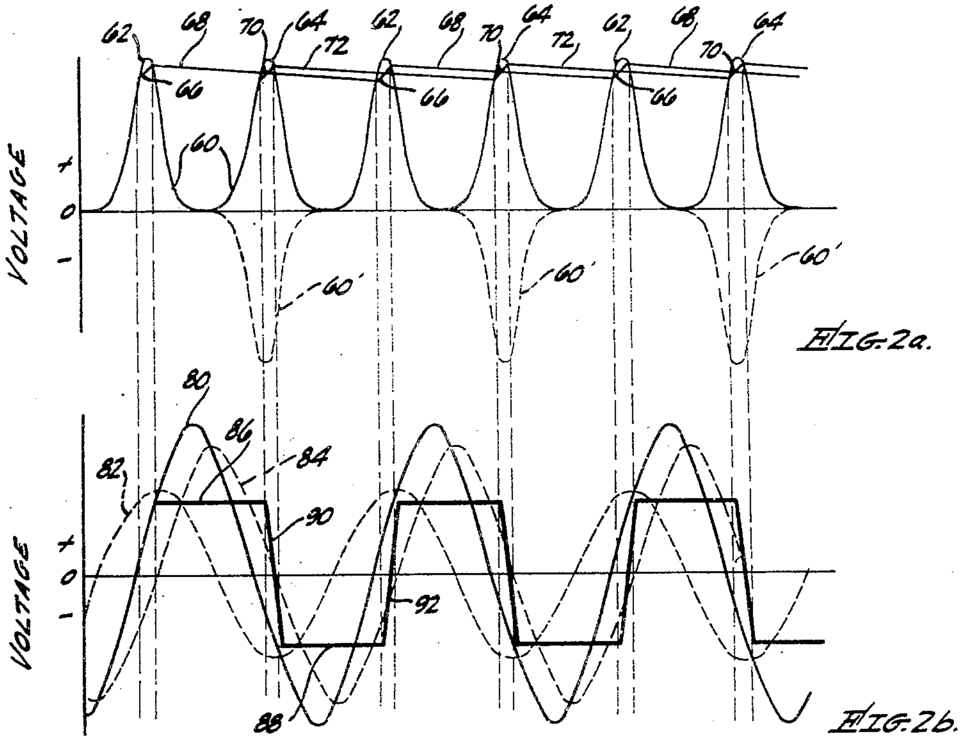
Figure 4:
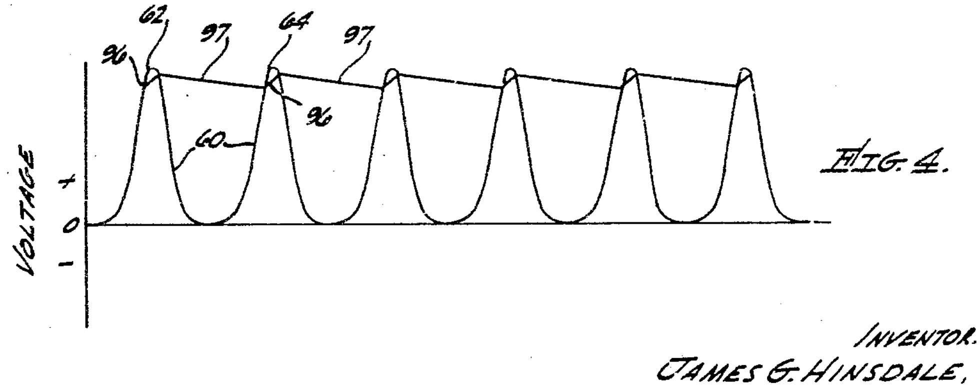

In the drawings,

Fig. 1 is a schematic diagram of a quadrature stripping network, in accordance with this invention, Figs. 2*a* and 2*b* illustrate wave forms to aid in explaining the operation of the network of Fig. 1, Fig. 3 is a partial schematic diagram, similar to Fig. 1, illustrating a modification of a portion of the stripping network, further in accordance with this invention, and Fig. 4 illustrates a waveform, similar to Fig. 2*a*, to aid in explaining the modification shown in Fig. 3.

Briefly, a quadrature stripping network in accordance with this invention comprises a unilaterally conductive switching circuit connected between low impedance input and high impedance output circuits, and an output storage capacitor connected across the input terminals of the output circuit. A full-wave rectifier circuit coupled to the switching circuit responds to a reference voltage of predetermined frequency to effect short period conduction of the switching circuit at a repetition rate equal to twice such frequency. Each conducting period terminates approximately at the peak of components of signals from the input circuit which are in phase with the reference voltage and at the minimum or zero value of components 90° displaced therefrom. When the switching circuit is rendered conducting, the output capacitor receives a charge representing the in-phase components. During non-conduction of the switching circuit, the charge on the capacitor is maintained because of the high impedance of the output circuit; further, during each succeeding conducting period, the charge on the capacitor is reversed, whereby a net cyclical output voltage approximating a square or rectangular wave form is established at the output circuit.

Referring to Fig. 1, a low impedance input circuit 10 and high impedance output circuit 12, are coupled through a switching device or circuit 14. This switching device comprises two pairs of unilaterally conductive switching devices, illustrated as diodes 16—18 and 20—22. The diodes of each pair are arranged in series, and the pairs are connected in parallel so that the diodes of one pair are in back-to-back relationship with the other. As illustrated, the junction 24 of the diodes 16—18 is connected to the ungrounded output terminal lead 26 from the low impedance input circuit 10, and the junction 28 of diodes 20—22 is connected to the input terminal lead 30 of output circuit 12. Connected between lead 30 and ground is a storage capacitor 32, to be charged and discharged in a manner hereinafter to be explained.

Control of the conduction of the diodes of switch 14 is accomplished by a full-wave rectifier network which comprises a transformer 34, to which a sinusoidal reference voltage, indicated at 36, is applied. Preferably, transformer 34 is arranged as a saturating transformer for developing a peaked output voltage wave, and for this purpose an impedance 40 is connected in series with one side of the primary winding 42. It will become apparent, however, that a conventional transformer, developing a sinusoidal output voltage wave, can be employed in the system of this invention.

The secondary winding 44 of transformer 34 has its end terminals connected through respective RC (resistor-capacitor) networks 46—47, 48—49 to the positive terminals of respective unidirectionally conductive rectifier devices, shown as diodes 50, 52. The negative terminals of rectifiers 50, 52 are connected together to provide a common junction point 54. The secondary winding 44 of transformer 34 has a center-tap 56, and this center-tap and junction point 54 are connected across the parallel arrangement of diodes 16—18 and 20—22.

Reference will be made to Fig. 2 along with Fig. 1 in describing the operation of the above circuit. As previously mentioned, the voltage across secondary winding 44 is peaked type, due to the action of saturating transformer 34, and essentially comprises alternating narrow voltage pulses. Diodes 50, 52 will be recognized as arranged for conventional full-wave rectification, whereupon the output voltage appearing between common junction point 54 and center-tap 44 will consist of unidirectional voltage peaks or pulses 60 (see Fig. 2*a*), the negative peaks 60′ of the cyclical peaked voltage being inverted in a conventional manner.

With the secondary winding 44 poled as indicated, capacitors 47, 49 are of course charged during the respective positive and negative half cycles of the peaked voltage wave form appearing across the secondary winding. It will be apparent that if these capacitors alone were in circuit between the end terminals of the secondary winding and the rectifiers 50, 52, they would receive a maximum charge which would be maintained and would prevent rectifiers 50, 52 and also the diodes 16—18 and 20—22, from being biased in the forward direction. Resistors 46, 48 provide leakage paths for portions of the charges on capacitors 47, 49; hence, during a portion of each half cycle of the peaked alternating voltage across secondary winding 44, the diodes of switch 14, and one of the rectifiers 50, 52, are biased in the forward direction. This charging and discharging are illustrated in Fig. 2*a*; during the occurrence of the positive half cycles 62, capacitor 49 is charged as indicated at 66, which charge is limited to a maximum determined by the total resistance in circuit with capacitor 49, following which a portion of the charge leaks off, as along lines indicated at 68, to a value determined by the RC product of resistor 48 and capacitor 49, from which point it is again charged during the succeeding positive half cycle 62. In a similar manner, capacitor 47 is charged during the negative half cycles 60′ of the input wave form, when, as represented by positive half cycles 64, the adjacent end terminal of secondary winding 44 is positive. As in the case of capacitor 49, capacitor 47 is charged during the occurrence of the half cycles 64, as along lines indicated at 70, which charge leaks off, as along lines indicated at 72, to a value determined by the RC product of resistor 46 and capacitor 47. During each interval when capacitor 47 or capacitor 49 is being charged, there is current conduction through the pairs of diodes 16—18 and 20—22. In Fig. 2*a*, the portions of the half cycles 62, 64 intercepted by the lines 66, 70 (denoting the charging of capacitors 49, 47) represent the intervals when the diodes of switch 14 are biased in the forward direction. At all points between half cycles 62, 64, and below the respective lines 68, 72 (which denote leakage), the diodes are biased in the reverse direction. Thus, the conducting periods of the switching device 14 corresponds to the charging periods for capacitors 47 and 49.

The operation of the above circuit is based upon the fact that when the diode pairs 16—18 and 20—22 are conducting, the respective junctions 24, 28 of the two pairs of diodes are at the same potential. For example, and assuming the diodes are of the same type, the mid-points (junctions 24, 28) of the respective branches of the parallel circuit formed by the pairs of diodes, are at the same potential. Upon application of a signal voltage of the fixed frequency to the input terminals 24, such signal voltage appears at junction 28 to charge capacitor 32. This phase of the operation of the circuit of this invention will now be described with reference to Fig. 2*b* along with Fig. 1.

Referring to Fig. 2*b*, the solid sinusoidal curve 80 represents a signal voltage from input circuit 10. Dotted curve 82 illustrates the component of signal 80 which is in phase with the reference voltage 36, and dotted curve 84 illustrates a quadrature component, i. e., a component which is 90° out of phase with the reference voltage. It has been found that if the conducting period for the switching device 14, which is controlled by the RC products of the RC networks 46—47 and 48—49, is designed to terminate near the peak of the in-phase component 82, the system will have maximum response for such in-phase component and zero response for the quadrature component 84. Under these circumstances, capacitor 32 attains a charge corresponding to the in-phase component 82, which charge is maintained at the output circuit 12 as a positive D.-C. voltage pulse during the succeeding period of non-conduction of switch 14. During the succeeding negative half cycle of the composite wave 80, that is, during the succeeding conducting period, the charge on capacitor 32 is reversed, and following such conducting period a negative pulse, indicated at 88, is provided at the output circuit 12. As illustrated, the positive and negative voltage pulses 86 and 88 together approach a rectangular wave form. The slope of the lines 90, 92 along which the charges across capacitor 32 reverse is determined by the duration of the conducting periods of the switch 14. For this reason, it is obviously desirable that the conducting periods be kept relatively short, e. g., of the order of 0.1 to 0.01 cycle.

To further aid the operation of the above circuit to attain the desired output voltage wave form, it is desirable that the RC product of capacitor 32 and the resistance presented by input circuit 10 be short relative to the frequency of the reference and signal voltage, and that the RC product of capacitor 32 and the resistance presented by the output circuit 12 be long compared to the sampling time (i. e., the conducting period) of the switching device 14.

Fig. 3 illustrates a modification of a portion of the quadrature stripping network of Fig. 1, wherein a single RC network 94—95 is employed. As illustrated, RC network 94—95 is connected between center-tap 56 and one end of the parallel arrangement of diodes 16—18 and 20—22. It will be obvious, of course, that such RC network could also be connected between common junction point 54 and switch 14. Since RC network 94—95 is in series with both rectifiers 50, 52 and switch 14, resistor 94 is chosen to permit capacitor 95 to be charged during each half cycle of the reference voltage, and hence switch 14 to be charged, for the desired period. Fig. 4 illustrates this condition, wherein lines 96 represented the charging of capacitor 95, and lines 97 represent the leakage during non-conduction of switch 14.

What is claimed is:

1. Means for producing a substantially rectangular wave voltage in selective response to a component of a cyclical input signal voltage which is in phase with a cyclical reference voltage of the same frequency, comprising a switch receiving the input signal voltage, timing means for controlling the operation of said switch, said timing means responding to the reference voltage to close said switch only for a portion of the in-phase component of the signal voltage and opening said switch substantially at the peak of such in-phase component, said portion being less than a quarter of a cycle, and capacitor means connected to said switch to receive a charge corresponding to the in-phase component when it is closed and to maintain such charge when it is open.

2. A combination according to claim 1, in which said timing means includes a full-wave rectifier, and circuit means having capacitance which accumulates charge when the switch is closed and resistance which provides a leakage path for part of the accumulated charge when the switch is open, the combined effects of said capacitance and resistance determining the period for accumulating the charge and closing the switch.

3. A combination in accordance with claim 2, in which said circuit means includes parallel resistor-capacitor means in circuit with said switch and said rectifier.

4. A quadrature stripping network comprising a low impedance input circuit for developing signal voltages of a predetermined frequency, said input circuit having a pair of output terminals, a high impedance output circuit having a pair of input terminals, one of the terminals of each of the input and output circuits being connected to a point of reference potential, a unidirectionally conductive switching device connected between the remaining terminals of said input and output circuits, a capacitor connected between the input terminals of said output circuit, a source of cyclical reference voltage of said predetermined frequency, rectifier means coupled between said source and said switching device to effect conduction of said switching device twice during each cycle of the reference voltage, said switching device being characterized in that said remaining terminals of said input and output circuits are at the same potential during conduction thereof, whereby signal voltages from said input circuit appear across said capacitor during conduction of said switching device, the end of each conducting period of said switching device substantially coinciding with the peak value of components of the input signal which are in phase with the reference voltage, said capacitor receiving a charge during each conducting period corresponding to the in-phase components, and the charge on said capacitor being maintained at said output circuit during the non-conducting period of said switching device.

5. A quadrature stripping network in accordance with claim 4, wherein said switching device includes two pairs of serially connected diodes, said pairs of diodes being connected in parallel, and the diodes of each pair being in back-to-back relation, the junction of one of said pair of diodes being connected to the output terminal of said input circuit and the junction of the other pair of diodes being connected to the input terminal of said output circuit.

6. A quadrature stripping network in accordance with claim 4, wherein said source of reference voltage includes a saturating transformer, said transformer including a secondary winding having end terminals, a parallel resistance-capacitance circuit connected to each end terminal, respective rectifier devices connected between said resistance-capacitance networks and a common junction point, a center-tap connection for secondary winding, and said center-tap connection and common junction point being coupled to said switching device.

7. In combination, a transformer having primary and secondary windings, said secondary winding having end terminals of said secondary winding to effect full wave rectification of voltages across said secondary winding, said transformer being of the saturating type responsive to a sinusoidal reference voltage of predetermined frequency to develop a cyclical peaked voltage, whereby the aforementioned full wave rectification results in unidirectional peaked voltage pulses, a unilaterally conductive switching device coupled between said center tap and said rectifier means, conduction control means connected in circuit with said switching device and responsive to said unidirectional voltage pulses to effect conduction of said switching device for a predetermined period during each unidirectional voltage pulse, said switching device having first and second terminals, low impedance means to apply to said first terminal of said switching device signal voltages having in-phase and quadrature components, the conduction periods of said switching device coinciding substantially with the peaks of the in-phase components, a high impedance output circuit including a capacitor connected between said second terminal and a point of reference potential, said capacitor receiving a charge during each conduction period corresponding to the average value of the in-phase components, and the charges on said capacitor being maintained at said output circuit during the periods of non-conduction of said switching device.

8. The combination defined in claim 7, in which said conduction control means comprises the parallel resistance-capacitance network, said network being connected in series between said center-tap and said rectifier means, and said resistor providing a leakage path for a portion of the charge developed across said capacitor during each unidirectional pulse.

9. The combination defined in claim 7, in which said conduction control means comprises respective parallel resistor-capacitor networks connected between the end terminals of said secondary winding and the respective rectifier devices, and said resistor comprising leakage paths for substantially equal portions of the charges developed across the associated capacitors during the unidirectional voltage pulses.

10. The combination defined in claim 9, wherein said switching device comprises first and second pairs of unilaterally conductive devices, the devices of each pair being connected in series, said pairs of devices being connected in parallel and in back-to-back relation, the junction of said first pair of devices forming said input terminal, and the junction of said second pair of devices forming said output terminal.

11. A quadrature stripping network comprising rectifying means to develop a full-wave rectified unidirectional voltage from a cyclical reference voltage of predetermined frequency, a switching device, said switching device having first, second, third and fourth terminals, means connecting said first and second terminals and said rectifying means to effect conduction of said switching device during predetermined portions of each half cycle of the reference voltage, said switching device being characterized in that said third and fourth terminals are of the same potential during conduction thereof, means to apply to said third terminal signal voltages including components in phase and components 90° out of phase with the reference voltage, and a capacitor means coupled to said fourth terminal to receive a charge during each conducting period of said switching device which corresponds to the average value of the in-phase components, and to maintain said charge when said switch is non-conducting.

12. A quadrature stripping network comprising rectifying means to develop a full wave rectified unidirectional voltage in response to a reference voltage of predetermined frequency, a switching device, said switching device having input and output terminals, conduction control means connected in circuit with said switching device and said rectifying means to effect conduction of said switching device during predetermined portions of each half cycle of the reference voltage, means to apply to said input terminals signal voltages including components in phase and quadrature components 90° out of phase with the reference voltage, a capacitor storage element connected between said output terminals, said switching device being characterized in that said signal voltage appear at said output terminals during conduction thereof, said control means being effective to terminate conduction of said switching device at the minimum value of the quadrature components to permit said storage element to receive a charge corresponding only to the average value of the in-phase components, and a high impedance output circuit coupled to said storage element.

No references cited.